United States Patent Office 3,798,270
Patented Mar. 19, 1974

3,798,270
ALPHA-IMINO AMINES
Richard J. Lee, Downers Grove, Ill., and Clarence M. Loane, Highland, Ind., assignors to Standard Oil Company, Chicago, Ill.
No Drawing. Filed Dec. 29, 1971, Ser. No. 213,712
Int. Cl. C07c *119/00*
U.S. Cl. 260—566 R      4 Claims

ABSTRACT OF THE DISCLOSURE

Reaction of an alpha-nitro alkyl amine containing nitro and amino groups on adjacent carbon atoms with an aliphatic primary amine or an aliphatic polyamine and sulfur dioxide reduces the nitro group and forms the corresponding aliphatic alpha-imino amine containing imino and amino groups on adjacent carbon atoms. Such aliphatic alpha-imino amines are useful per se as antioxidants, surfactants, detergents, anti-rust agents, and flotation agents in aqueous and hydrocarbon systems, or as chemical intermediates, for example, for preparation of dyes.

FIELD OF THE INVENTION

This invention relates to the preparation of aliphatic alphaimino amines containing imino and amino groups on adjacent carbon atoms and to the products so formed.

SUMMARY OF THE INVENTION

It has been discovered that reaction of alpha-nitro alkyl amines containing nitro and amino groups on adjacent carbon atoms with aliphatic primary amines or aliphatic primary polyamines and sulfur dioxide effects a reduction of the nitro group on the nitro alkyl amine and formation of the corresponding aliphatic alpha-imino amine containing imino and amino groups on adjacent carbon atoms.

The alpha-imino amines of this invention have the formula $$R-\underset{\underset{R_5-N}{\|}}{C}-\underset{\underset{R_1}{|}}{CH}-\underset{\underset{R_2}{|}}{N}-R_3$$

wherein R is alkyl or cycloalkyl; $R_1$ and $R_2$ are either hydrogen or alkyl; $R_3$ and $R_5$ are either alkyl, cycloalkyl, or

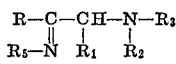

wherein $R_4$ is a divalent alkylene group of 2 to 10 carbon atoms and $n$ is 1 to 10; or $R_2$ and $R_3$ are carbon atoms of a heterocyclic group containing at least 1 nitrogen atom.

In accordance with this invention, preparation of the aliphatic alpha-imino amines comprises reacting in an aprotic solvent reaction medium (A) an alpha-nitro alkyl amine, (B) an aliphatic amine having the formula R—NH$_2$ wherein R is alkyl or cycloalkyl, or an aliphatic polyamine having the formula

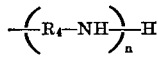

wherein R' is a divalent alkylene group of 2 to 10 carbon atoms and $n$ is 1 to 10, and (C) sulfur dioxide under liquid phase reaction conditions at a temperature of from about 70° F. to about 140° F. for a period of time sufficient to reduce the nitro group on reactant (A) and thereby form the corresponding aliphatic alpha-imino amine, the amount of reactant (B) being at least 1, preferably 3 or more, mol per mol of (A), and the amount of reactant (C) being at least 2 mols per mol of reactant (A).

The nitroalkyl amines which are converted to the corresponding imino amines in accordance with this invention have the formula

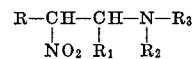

wherein R is alkyl or cycloalkyl; $R_1$ and $R_2$ are either hydrogen or alkyl; $R_3$ is either alkyl, cycloalkyl, or

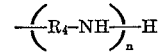

wherein $R_4$ is a divalent alkylene group of 2 to 10 carbon atoms and $n$ is 1 to 10; or $R_2$ and $R_3$ are carbon atoms of a heterocyclic group containing at least 1 nitrogen atom.

Such nitro alkyl amines are well-known compounds and can be provided by a variety of methods. For example, by reaction of an amine, a nitroparaffin and formaldehyde as disclosed in U.S. Pat. No. 3,247,053. Also, by addition of an amine to a nitroalkene to form the corresponding nitroalkyl amine as disclosed in U.S. Pats. 2,520,104; 2,523,337; 2,527,292 and 2,615,920. Another preparation is by reaction of an aliphanitro alkyl chloride of the formula

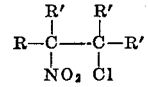

wherein R is alkyl or cycloalkyl and R' is hydrogen or an alkyl and either a primary or secondary alkylamine having the formula R—NH—R' wherein R is alkyl or cycloalkyl, and R' is hydrogen or alkyl or R and R' together form a heterocyclic group, or a polyalkylene polyamine having the formula

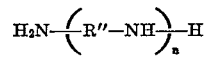

wherein R'' is a divalent alkylene group of 2 to 10 carbon atoms and $n$ is 1 to 10. Still another method for preparing the nitroalkyl amines is by reacting the aforesaid amines with a nitro-nitrato alkane having nitro and nitrato groups on adjacent carbon atoms in the presence of water at a temperature of from about 100° to about 140° F. Such nitro-nitrato alkanes can be obtained by the nitration of alkenes with nitrogen dioxide under oxidizing conditions. Illustrative of amines suitable for use in preparing the nitroalkyl amines are methylamine, ethylamine, propylamine, cyclohexylamine, decylamine, dodecylamine, hexyldecylamine, octadecylamine, etc.; dimethyl amine, diethylamine, dibutylamine, etc.; piperazine; ethylene diamine, diethylene triamine, triethylene tetramine, octamethylene diamine, tetraethylene pentamine, etc.

The amine reactant (B) is either a primary amine of the formula R—NH$_2$ wherein R is alkyl or cycloalkyl, or a polyalkylene polyamine having the formula

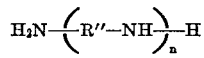

as described above.

The preparation of the imino amines is effected by dissolving reactants (A) and (B) in an aprotic solvent such as hexane, toluene, methylene chloride, dichloromethane, chloroform, etc. and then passing sulfur dioxide into the solution preferably at a rate of about 0.5–1.0 cubic feet per hour until the reaction mixture shows the absence of nitro group by infra-red analysis. Under these conditions, the nitro group is reduced with the formation of iminosulfuric acid as a by-product and the substitution of the imino group for the nitro group on the nitroalkylamine to form the corresponding imino amine. Resolution of the reaction mixture for recovery of the imino amine is facilitated by using an excess of amine reactant (B)

so as to assure formation of the insoluble amine salt of the iminosulfuric acid by-product. In such case, the reaction mixture is merely filtered and the imino amine recovered from the filtrate by removal of the solvent. It is to be understood that additional amounts of solvent may have to be added during the course of reaction in order to maintain reactants in solution.

DESCRIPTION OF PREFERRED EMBODIMENT

An imino amine having the formula $$C_{16}H_{33}-C-CH_2-NH-C_2H_4-NH_2$$
$$\|$$
$$N-C_2H_4-NH_2$$

was prepared from octadecene-1 in three steps:

Step one.—One mol, 252 g., of octadecene-1 was dissolved in 250 ml. of dichloromethane and gaseous nitrogen dioxide was introduced into the solution, while rapidly stirring, and holding the temperature at 80–100° F., at a rate of one cubic foot per hour (CFH) for about 4 hours when absorption of $NO_2$ ceased. Thereafter, the reaction mixture was treated with gaseous oxygen, while maintaining the mixture temperature at about 100° F., at the rate of one CFH for 2 hours to form the corresponding nitro-nitrato octadecene with the nitro and nitrato groups on adjacent carbon atoms. The reaction mixture was then purged with nitrogen to remove dissolved gases and most of the solvent.

Step two.—The nitro-nitrato octadecene of step one was added to a 50% aqueous solution of ethylene diamine (60 g., 1 mol) and reacted at about 140° F. for about 4 hours at which time infra-red analysis showed the absence of nitrato groups in the reaction mixture. The corresponding nitro amine having nitro and amino groups on adjacent carbon atoms was recovered by repeated washing with aqueous sodium bicarbonate until the aqueous wash was weakly alkaline and then taken up in chloroform.

Step three.—To the chloroform solution of the nitro amine of Step two was added 70 ml. (1.16 mol) of ethylene diamine and solution treated with gaseous sulfur dioxide at 0.5 CFH flow rate until the absence of nitro group was shown by infra-red analysis, about 24 hours. During the sulfur dioxide treatment, additional amounts of chloroform were periodically added to keep reactants in solution. The reaction mixture was filtered to remove the imino sulfuric acid and solvent removed by heating the filtrate with nitrogen purge to 250° F. The imino amine so formed was a waxy solid on cooling to room temperature.

An SAE–30 grade mineral oil containing 10 wt. percent of the imino-octadecyl amine prepared above was used as lubricant in 2-cycle lawnmower gasoline engine test. In this test a commercial one cylinder lawnmower is operated, using gasoline containing a ratio of 25 parts gasoline to 1 part of oil, for 24 hours. If spark plug fouling occurs during the test, the plug is replaced and test continued for the 24-hour period. At the end of the test period, the engine is dismantled and the parts rated for varnish, port blocking and ring sticking. The test using the aforesaid oil as 2-cycle lubricant showed no spark plug fouling during the 24-hour run, no ring sticking, 2% port blocking and a varnish rating of 5.5 (10 perfect). The results of this test show that imino amines of this invention are effective additives in lubricating oils.

Imino amines prepared in accordance with this invention are useful as oil-well drilling agents, ore flotation agents, anti-oxidants, surfactants, and anti-rust agents in aqueous and hydrocarbon systems. The oil-soluble imino amines containing at least 8 carbon atoms are especially useful as additives in hydrocarbon products such as lubricating oils, middle distillate fuels, diesel fuels, gasoline and greases.

What is claimed is:

1. The process of preparing aliphatic alpha-imino amines comprising reacting in an aprotic solvent reaction medium (A) an alpha-nitro alkyl amine having the formula $$R-CH-CH_2-NH-\left(C_2H_4-NH\right)_n-H$$
$$|$$
$$NO_2$$

wherein R is alkyl of at least 8 carbon atoms and $n$ is 1 to 4, (B) an aliphatic polyamine having the formula $$H_2N-\left(R'-NH\right)_n-H$$

wherein R' is a divalent alkylene group of 2 to 10 carbon atoms and $n$ is 1 to 10, and (C) sulfur dioxide under liquid phase reaction conditions at a temperature of from about 70° F. to about 140° F. for a period of time sufficient to reduce the nitro group on reactant (A) and thereby form the corresponding aliphatic alpha-imino amine, the amount of reactant (B) being at least 1 mol per mol of (A), and the amount of reactant (C) being at least 2 mols per mol of reactant (A).

2. The process of claim 1 wherein reactant (A) is $$C_{16}H_{33}-CH-CH_2-NH-C_2H_4-NH_2$$
$$|$$
$$NO_2$$

reactant (B) is ethylene diamine; and said imino amine has the formula $$C_{16}H_{33}-C-CH_2-NH-C_2H_4-NH_2$$
$$\|$$
$$N-C_2H_4-NH_2$$

3. Aliphatic imino amines having the formula $$R-C-CH_2-NH-\left(C_2H_4-NH\right)_n-H$$
$$\|$$
$$N-\left(C_2H_4-NH\right)_n-H$$

wherein R is an alkyl of at least 8 carbon atoms, and $n$ is 1 to 4.

4. An imino amine of claim 3 wherein $n$ is 1, and R is hexadecyl.

References Cited

UNITED STATES PATENTS 2,582,292  1/1952  Sondern et al. ____ 260—566 RX
3,694,498  9/1972  Ash et al. _____ 260—566 RX LEON ZITVER, Primary Examiner G. A. SCHWORTZ, Assistant Examiner U.S. Cl. X.R.

44—73; 75—2; 252—50, 8.55 R, 357, 390, 405